(12) United States Patent
Hughes

(10) Patent No.: US 6,852,037 B2
(45) Date of Patent: Feb. 8, 2005

(54) FASTENER HAVING RECESS USEABLE WITH MULTIPLE DRIVERS AND METHOD OF MANUFACTURE

(75) Inventor: Barry J. Hughes, Gloucester, MA (US)

(73) Assignee: Phillips Screw Company, Glouster, MA (US)

(*) Notice: Subject to any disclaimer, the term of this patent is extended or adjusted under 35 U.S.C. 154(b) by 0 days.

(21) Appl. No.: 10/671,225

(22) Filed: Sep. 25, 2003

(65) Prior Publication Data

US 2004/0062623 A1 Apr. 1, 2004

Related U.S. Application Data

(62) Division of application No. 10/153,547, filed on May 21, 2002.
(60) Provisional application No. 60/360,270, filed on Feb. 26, 2002.

(51) Int. Cl.[7] .............................................. B21H 3/02
(52) U.S. Cl. ........................ 470/63; 470/148; 470/205
(58) Field of Search .......................... 470/8, 9, 11, 12, 470/60, 63, 148, 205

(56) References Cited

U.S. PATENT DOCUMENTS

| | | | |
|---|---|---|---|
| 2,046,839 A | 7/1936 | Phillips et al. ................ 85/45 |
| 2,082,748 A | 6/1937 | Brown ........................... 85/45 |
| 2,474,994 A | 7/1949 | Tomalis ......................... 85/45 |
| 3,028,781 A | * 4/1962 | Muenchinger ............... 411/404 |
| 3,108,623 A | 10/1963 | Muenchinger ................ 145/50 |
| 3,237,506 A | 3/1966 | Muenchinger ................. 85/45 |
| 3,238,540 A | * 3/1966 | Muenchinger ............... 470/63 |
| 3,858,261 A | * 1/1975 | Uozumi ....................... 470/63 |
| 3,972,083 A | * 8/1976 | Dreger ........................ 470/63 |
| 4,089,357 A | 5/1978 | Gill .............................. 145/50 |
| 4,126,908 A | * 11/1978 | Gill .............................. 470/63 |
| 4,151,621 A | * 5/1979 | Simmons ..................... 470/63 |
| 5,020,954 A | 6/1991 | Dreger ........................ 411/403 |
| 5,203,742 A | 4/1993 | Grady .......................... 470/63 |
| 5,358,368 A | 10/1994 | Conlan et al. ............. 411/410 |
| 5,364,212 A | 11/1994 | Gill .............................. 411/404 |
| 5,674,037 A | 10/1997 | Lu .............................. 411/410 |
| 6,223,634 B1 | 5/2001 | Hughes et al. ................ 81/460 |
| 6,234,914 B1 | 5/2001 | Stacy ........................... 470/63 |
| 6,314,840 B2 | 11/2001 | Bozonnet ................... 81/121.1 |
| 6,584,876 B2 * | 7/2003 | Totsu .......................... 81/460 |

FOREIGN PATENT DOCUMENTS

GB          2 092 253          8/1992

\* cited by examiner

*Primary Examiner*—Ed Tolan
(74) *Attorney, Agent, or Firm*—Perman & Green, LLP

(57) ABSTRACT

A fastener is described having a head formed with a recess which accommodates a square head driver, symmetrical drivers, such as PHILLIPS™ style drivers, asymmetrical style cross head drivers, such as POZIDRIV® style drivers, and combination square and cross drivers without compromising performance of the drivers.

5 Claims, 3 Drawing Sheets

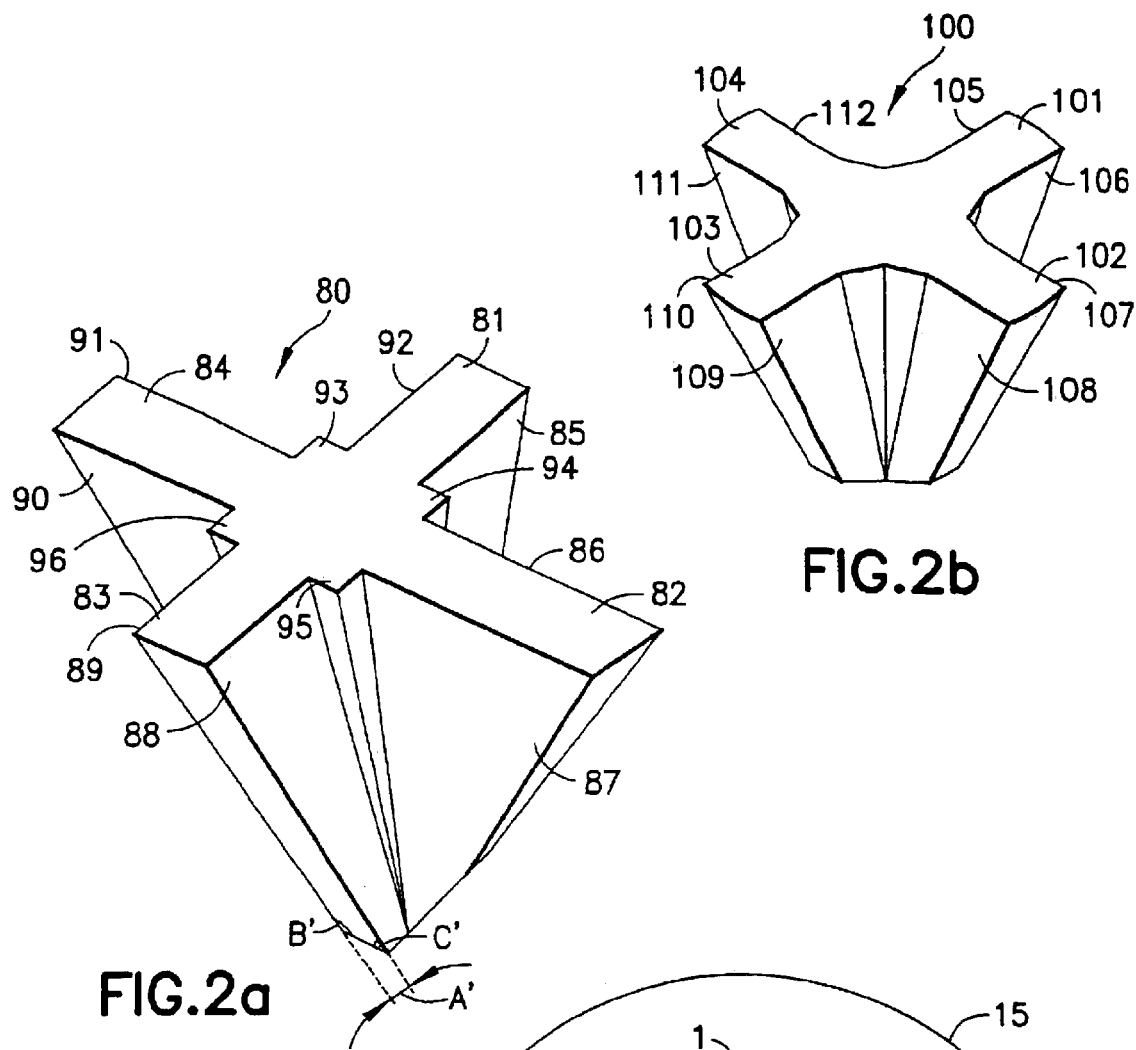
FIG.2a
FIG.2b
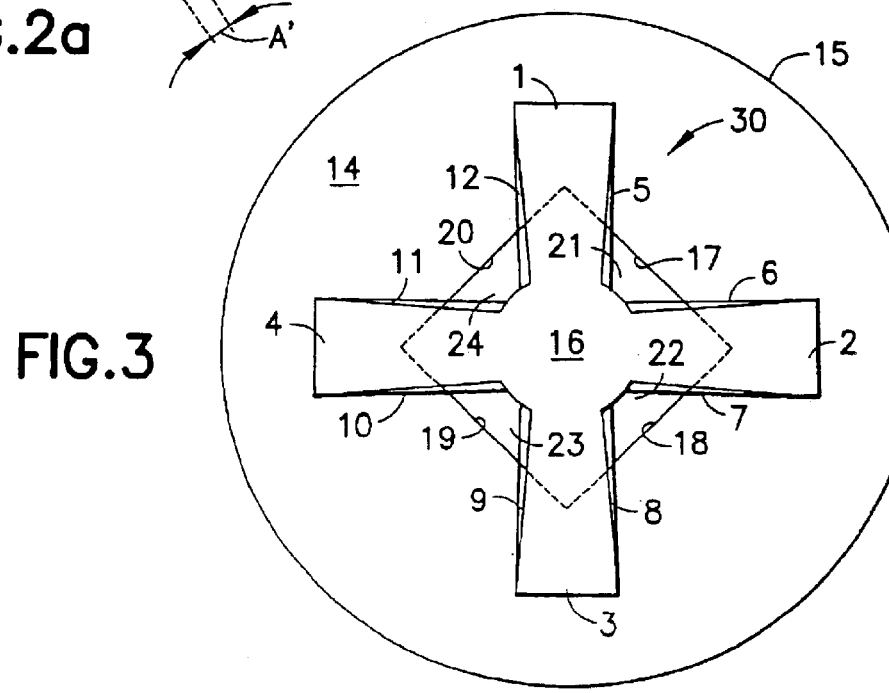
FIG.3

US 6,852,037 B2

FASTENER HAVING RECESS USEABLE WITH MULTIPLE DRIVERS AND METHOD OF MANUFACTURE

CROSS REFERENCE TO A RELATED APPLICATION

This application is a divisional of and claims priority from U.S. patent application No. 10/153,547, filed May 21, 2002 which claims the benefit of provisional application Ser. No. 60/360,270, filed Feb. 26, 2002.

BACKGROUND OF THE INVENTION

There are several drivers with specialized engagement surfaces in prevalent use for industrial and domestic purposes. These drivers are, in general, only useable with screws having recesses which match the drivers. The manufacturing processes for these screws insure a proper fit with efficient transmission of torque from the driver to the screws. A common example of such drivers is the Philips head screw driver with its familiar cross wing configuration. A fastener of this type is disclosed in U.S. Pat. No. 2,046,839 and the disclosure of this patent is incorporated herein by reference. Fasteners of this type are in widespread use.

Although PHILLIPS head screw are used with great success, a common complaint with regard to such fasteners is that the driver tends to slip out of the recess, when the application of high torque is required. This so-called "cam out" occurs because the driving surfaces of the PHILLIPS head fastener taper at an included angle of 8°–27°. In order to overcome this inconvenience and to provide a fastener which provides a high torque capability, the driving surface was constructed more vertical as described in U.S. Pat. No. 2,474,994. The disclosure of the '994 patent is also incorporated herein by reference. Fasteners of this type are available from licensees of Phillips Screw Company and sold under the trademark POZIDRIV.

Another type of driver referred to as the "square drive" is designed to fit the Robertson square drive recess and is also in common use.

It is a purpose of this invention to provide a recess which effectively accommodates any of the above drivers and to provide an optimum driver adapted especially for use with this unique recess.

To better understand the invention of this application, it is beneficial to consider the basic process of manufacturing the drivers and mating fastener heads of the above referenced fasteners. It is key in the process to construct, to close tolerances, a die which is used to cold form drivers and punches by pressing. Punches are tools used to cold form the recess in the fastener head. Since each element is used progressively to obtain the final product, it should be realized that errors become compounded throughout the process.

A master tool having all of the attributes of the punch and driver is constructed as a first step. This tool is generally machined from an appropriate metal blank using an abrasive wheel. In the case of the PHILLIPS cross head tool, this requires four passes, between which the tool is rotated 90°. The tool is held at angle to the path of the wheel to construct grooves in the master tool that become more shallow as the machining stroke progresses from the tip to the shank of the master tool blank. The die is formed using the master tool by hobbing or pressing the master tool into die stock. This may take several strokes to obtain the fully formed die. The die is then used to cold form a punch which is in turn used as the tool to cold form a recess in the head of the fastener.

Drivers are constructed in a manner similar to the punches and are identical in shape to the punch and master tool.

The manufacture of the PHILLIPS cross head master is relatively straight forward because the driving surfaces are symmetrical. This is not the case with respect to the manufacture of the vertical driving surfaces of the modified cross head fastener of the '994 patent. In this instance, it has been found that to obtain an accurate relationship with respect to the driving surfaces of a wing of the recess and that of the driver, it is necessary to construct the forward driving face vertical and the reverse driving face at a small taper. The planes of these tapered surfaces, if extended, would intersect at an included angle of 2.5° or looking at it another way the reverse driving surface is tapered at an angle of 2.5° to the forward driving surface. This provides the needed relief from cam out in the forward direction where it is more problematic.

To accomplish this according to the above process, the master tool blank is machined using eight strokes, between which, the blank is rotated and the angle of the blank with respect to the wheel path is also adjusted. This involves the machining of compound angles, i.e., angles which are dependent on other angles and is extremely complex and difficult to control to the required tolerances. The machining of the master tools for such asymmetrical cross head screws is an acknowledged challenge.

Although attempts have been made to combine the Robertson square drive with a PHILLIPS type drive, see U.S. Pat. Nos. 5,358,368 and 5,020,954, these have not been well received and do not accommodate the use of an asymmetrical driver. U.S. Pat. No. 2,082,748 discloses a fastener that combines a Robertson recess with a PHILLIPS type recess and a slot type recess. It appears that such attempts have generally compromised the advantage of one type of recess or the other.

It is a purpose of this invention to provide a recess for a fastener which will accommodate a square driver, and symmetrical and asymmetrical cross bladed type drivers. This recess therefore, will accommodate the wide variety of fastener drivers currently in use. It is a purpose of this invention to provide such a recess while avoiding the complex manufacturing requirements of the asymmetrical type cross head and without compromising the beneficial features of the common driver configurations. It is also a purpose to provide a unique driver to take and advantage of all of the unique features of the new recess.

SUMMARY OF THE INVENTION

A cross type recess is constructed on the head of a threaded fastener having its driving faces tapered symmetrically. The taper is designed to provide an included angle between the driving surfaces equal to the standard included angle of an asymmetrical cross head recess. A square drive recess is incorporated into the geometry of the cross type recess at the outer portion of the recess, thereby forming an overall recess configuration that will accommodate the standard drivers associated with the square drive recess, the symmetrical cross head drivers, and the asymmetrical cross head drivers. In addition such fasteners can be used which is constructed with the full geometric form of the recess. This allows fasteners, formed with the recess of this invention, to be driven with the majority of drivers prevalent in the current market.

The cross head recess of this invention is formed from a punch which is in turn formed from a die which is in turn formed by a machined master tool. The master tool is machined with a grinding wheel using four passes to obtain symmetrically shaped grooves defined by driving surfaces tapered at ½ of the included angle of the standard asymmetrical cross type recess.

The cross portion of the recess extends to the full depth of the recess while the square portion of the recess extends to a lesser depth. The depth of the square portion of the recess is chosen to be within the geometry of the cross recess, thereby providing a clearance for the ridges at the corners between opposite wing faces of the asymmetrical tool. Such ridges are a by product of the manufacturing process of asymmetrical type drivers and are one factor which hinders the interchangeable use of the cross type drivers. Another hindering factor is the symmetrical versus asymmetrical tapering of the driving surfaces. By using a symmetrical taper as in the original cross head design, at an angle which accommodates the included angle of the asymmetrical cross head design, it has been found that each type of driver can be used in the recess of this invention without compromising the torque transmittal characteristics of the drivers. In addition "cam out" is minimized and the manufacturing process is simplified.

In order to accommodate the multiple drivers the recess of this invention has a unique shape. Engagement with anyone of the standard drivers will provide an effective transmission of torque from the driver to the fastener utilizing the unique features of each type of driver. Nevertheless a driver especially constructed to match the recess will have further advantages over any of the individual types. Such a driver is constructed to match the master tool or punch of this invention for application specifically for engagement with the universal recess of this invention.

DESCRIPTION OF THE DRAWING

The invention is described in more detail below with reference to the attached drawing in which:

FIG. 2(a) is a perspective view of a tip of an asymmetrical driver;

FIG. 2(b) is a perspective view of a tip of a symmetrical driver;

FIG. 3 is an a top view of a fastener showing the recess according to this invention.

DESCRIPTION OF THE PREFERRED EMBODIMENT

The specifications for recesses and drivers of the types referenced above and further described herein are controlled by industrial standards to provide continuity of configuration across the wide variety of applications and manufacturers. Therefore when a particular fastener is described herein, a fastener complying with such standards are intended. The Industrial Fastener Institute (IFI) promulgates such standards in particular in ASME rev. B18.6.5M, 1998. In these standards Type I refers to symmetrical cross recessed fasteners, Type Ia refers to asymmetrical cross recessed fasteners, and Type III refers to square recessed fasteners.

Figure 4:
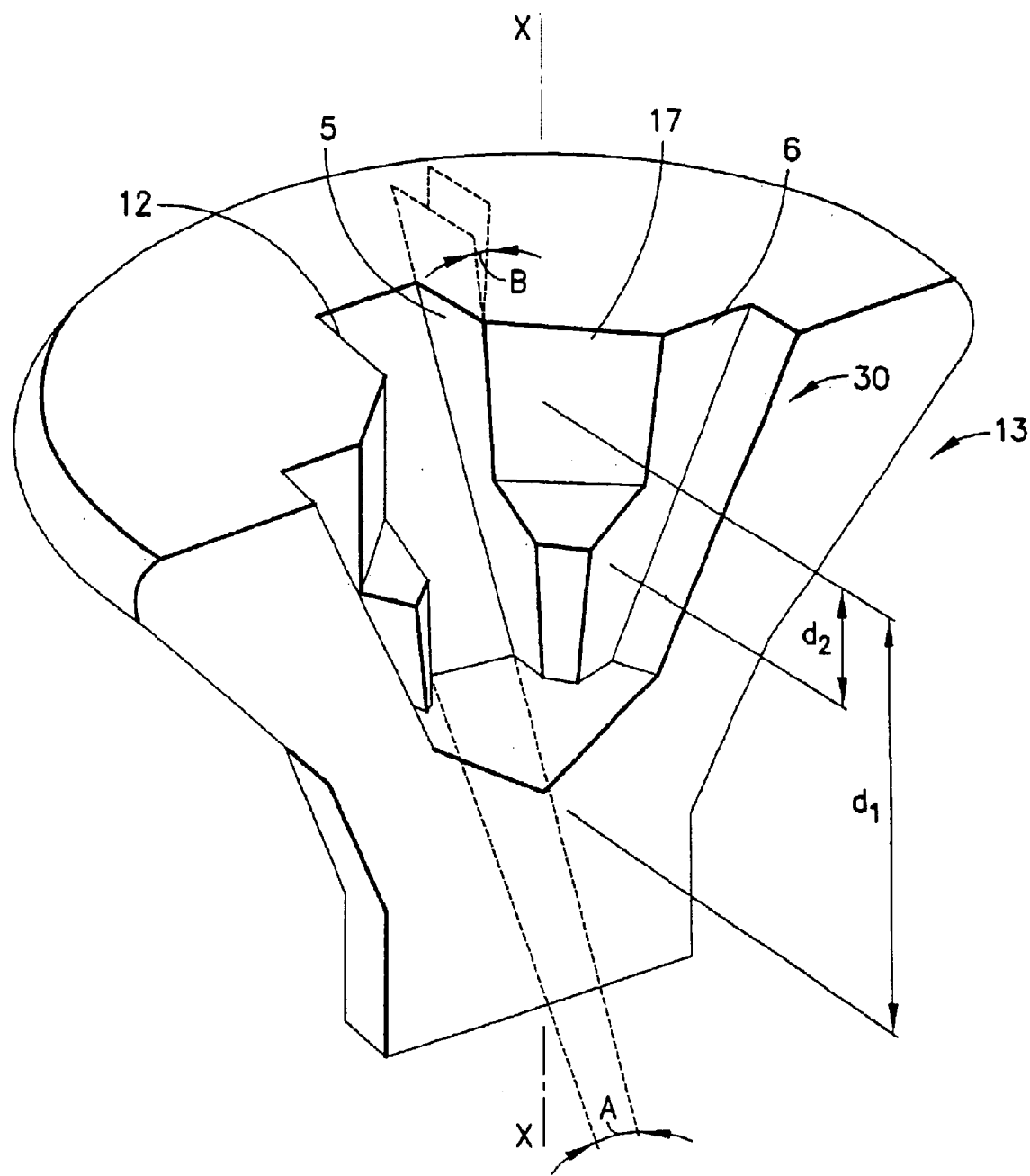
FIG. 4 is a cut away perspective view of the head of a fastener showing the recess according to this invention.

As shown in FIGS. 3 and 4, the recess 30 of this invention is formed with wing shaped cross slots 1–4. These slots are defined by opposing walls 5–12 which provide the driving surfaces of the fastener 13. The recess 30 has an opening at the top surface 14 of fastener head 15 and extends downward, a depth $d_1$, to its bottom 16. At the top surface 15, the opening of the recess 30 has a combination square and cross shaped opening. Square driving surfaces 17–20 are formed to an intermediate depth $d_2$ which is less than the full depth $d_1$ of the recess 30.

Figure 1:
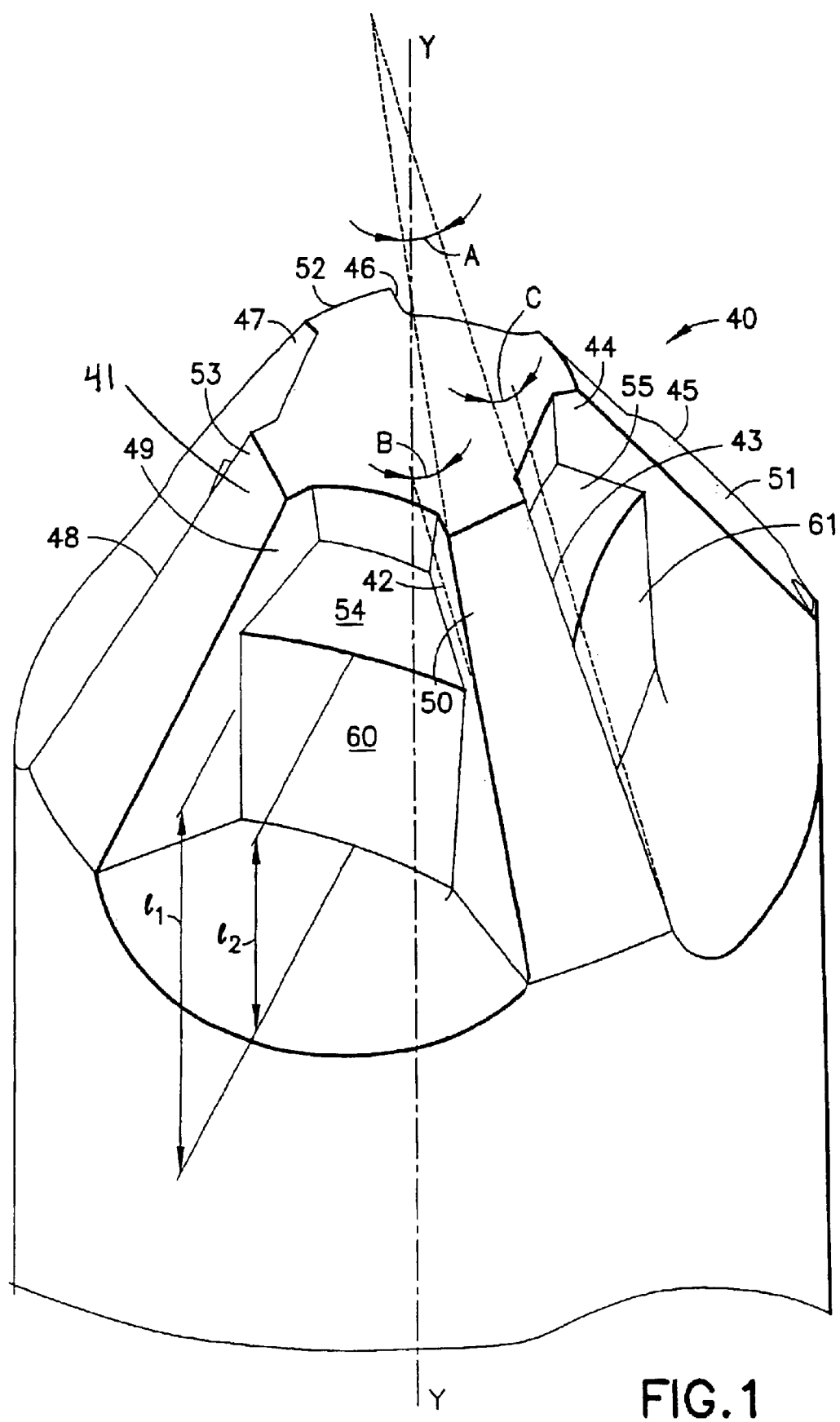
FIG. 1 is a perspective view of a master tool used in the formation of a recess in accordance with this invention.

The opposing walls 5 and 12 form the slot 1 and are constructed at an angle to the vertical, i.e. to the longitudinal axis x shown in FIG. 4, in which the walls are converging from top to bottom. The angle of convergence A is also referred to as the included angle and is equal to the included angle of the asymmetrical cross head fastener as set out in the applicable ASME standard. This angle is obtained by tapering the walls 5–12 symmetrically at angles B and C, as shown in FIGS. 1 and 4. According to the standard, this would mean that angles B and C are 1.25°, thereby forming a converging angle A of 2.5°. The opposing walls 6 and 7, 8 and 9, and 10 and 11 are similarly constructed to provide a cross head recess 30 with symmetrical slots having opposing driving surfaces converging at 2.5°.

The outer portion of the recess 30 is shaped to accommodate a square driver according to the applicable standard. Substantially vertical walls 17–20 intersect at right angles as shown in phantom in FIG. 3. Walls 17–20 include transition shoulders 21–24 which taper downward to form the bottom seat of the square drive portion of the recess 30 of fastener 15. The depth $d_2$ of the square drive portion is selected to position the square drive driving surfaces, i.e. walls 17–20, within the geometry of the cross drive portion of recess 30. This will provide a clearance for the asymmetrical driver 80, as described below.

To manufacture the recess 30, a master punch 40 is constructed of tool grade steel, as shown in FIG. 1. The purpose of the master punch 40 is to form a die (not shown) having a female die cavity in the form of the recess 30. The die is used to form punches for cold forming the recess 30 into the heads of fasteners and to form drivers optimally configured to engage the recess 30. Master punch 40 is machined having grooves 41 which are defined by symmetrically tapered walls 42–49. The walls 42–49 also define blades 50–53 which converge towards tool axis y, from shank to tip. The blades 50–53 match the cross shape of the recess 30 and extend the full length $l_1$ of the active surface of master punch 40. Adjacent walls, such as 42 and 43 of blade 50, converge at an included angle A with each wall forming an angle to the vertical, B and C of ½ of included angle A. For the purpose of this description vertical refers to a plane parallel to axis y.

To form the square drive portion of recess 30, the master punch 40 is machined with intermediate shoulders 54–57, 54 and 55 being shown in FIG. 1 (56 and 57 not shown), shoulders 54–57 taper towards axis y. The shoulders extend to axially parallel walls 60–63 having a length $l_2$ (62 and 63 not shown). These shoulders and walls match the shape of the square drive portion of recess 30.

In operation the square driver fits into the square portion of the recess 30 in a normal fashion for effective transmission of torque to the screw. A tip of a standard PHILLIPS style cross driver 100 is shown in FIG. 2(b). The driver 100 is constructed with blades 101–104 defined by driving surfaces 105–112. The driving surfaces converge symmetrically towards its tip at included angles of between 8°–27°. The driver 100 will also fit easily into the recess 30, but its driving surfaces will engage primarily at the top of the recess. This is an advantage as this provides an increased leverage for the transmission of torque.

A tip of an asymmetrical driver 80, which includes those for use with fasteners sold under the trademark POZIDRIV, is shown in FIG. 2(*a*). The driver 80 is constructed with blades 81–84 defined by driving surfaces 85–92. The driving surfaces converge asymmetrically towards its tip at included angles of 2.5°. Driver 80 includes ridges 93–96 at the corners between opposite driving surfaces 85–92 of the asymmetrical tool. The ridges 93–96 are a by-product of the manufacturing process of asymmetrical type drivers and are one factor which hinders the interchangeable use of the cross type drivers. Because of the clearance formed by the depth of the square head portion of the recess 30, an asymmetrical driver, such as driver 80, also fits snuggly into the recess 30 with a slight clearance at its non-driving side, but an effective engagement over the face of the driving surface. Because of the small angle of taper, i.e. 1.25°, "cam out" is minimized with the symmetrical driver. Fastener heads which employ the recess of this invention, therefore, accommodate all of the prevailing drivers in a manner that maintains the advantages of each without compromising performance.

Although it is intended that the fasteners utilizing the recess 30 will be used with the existing drivers constructed in accordance with industry standards, it is understood that it would be useful to have a new driver formed to fully engage the unique configuration of the surfaces of recess 30. A driver of this type is constructed having the shape of the master tool 40 while incorporating standard clearance tolerances to facilitate insertion and release of the new driver into and from the recess 30. All of the surfaces of a new driver constructed to optimize the use of the recess of this invention are shown in FIG. 1 and further description is unnecessary.

I claim:

1. A tool for forming a recess, said tool having a working portion extending from a shank to a tip a first distance, said working portion of said tool comprising:

a cross winged portion extending said first distance from said shank to said tip having an overall cross wing outer profile, said wings being formed by adjacent walls, wherein said adjacent walls converge, from said shank to said tip, at a symmetrically formed included angle having an overall size that is substantially equivalent to an included angle of an asymmetrical cross recessed fastener manufactured in conformity with a standard for type Ia fasteners; and a square portion, having an overall square outer profile, extending a second distance, that is less than said first distance, wherein said overall square outer profile is within said overall cross wing outer profile.

2. A tool for forming a recess, according to claim 1, wherein said included angle is 2.5 degrees.

3. A tool for forming a recess, according to claim 1, wherein said adjacent walls are each inclined at an angle of 1.25 degrees to the vertical to cause said convergence.

4. A tool for forming a recess, according to claim 1, wherein the tool is used to form a recess in the head of a fastener.

5. A tool for forming a recess, according to claim 1, wherein the tool is used to form a cavity in a die.

* * * * *